(No Model.) 2 Sheets—Sheet 1.
C. T. HANNA.
BOLTING REEL.
No. 408,914. Patented Aug. 13, 1889.
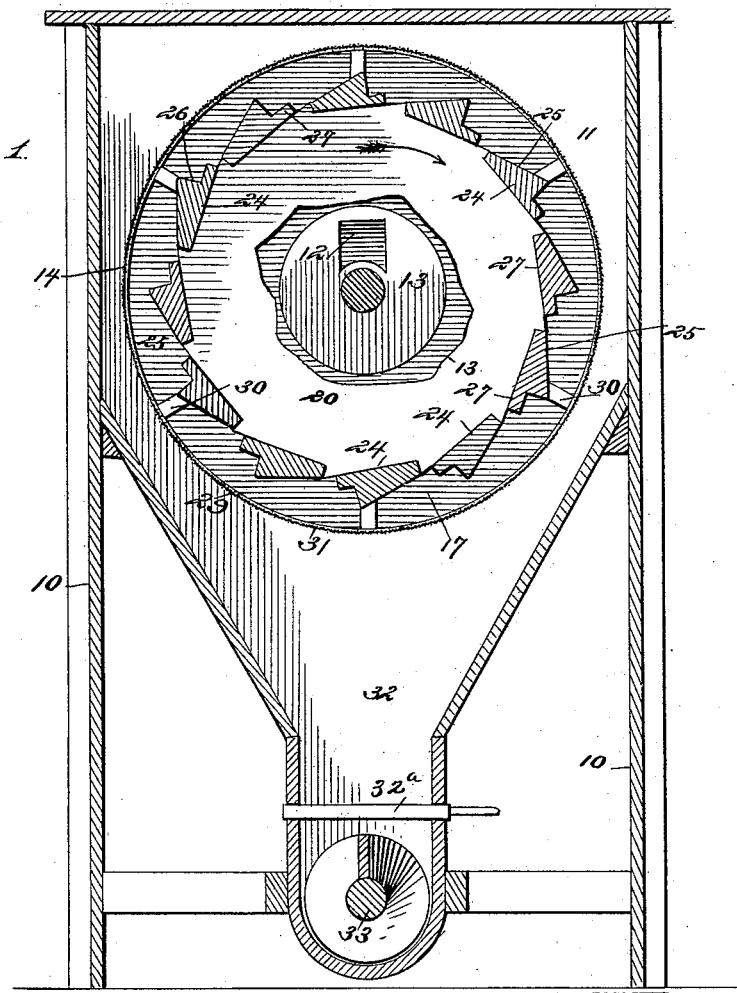
Fig. 1.
Fig. 2.
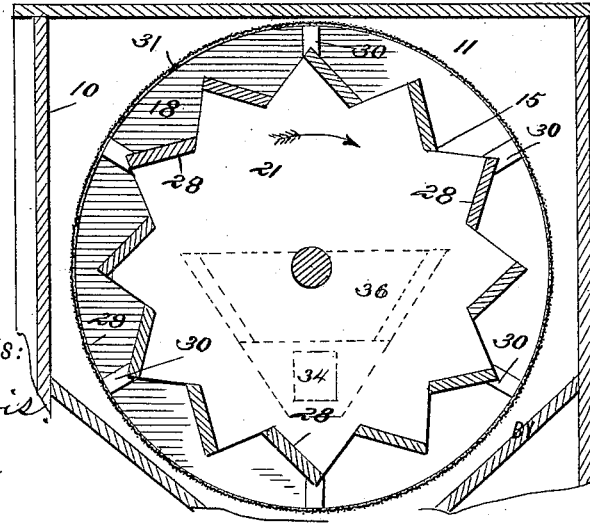
WITNESSES:
W. R. Davis
C. Sedgwick
INVENTOR:
C. T. Hanna
Munn & Co.
ATTORNEYS.

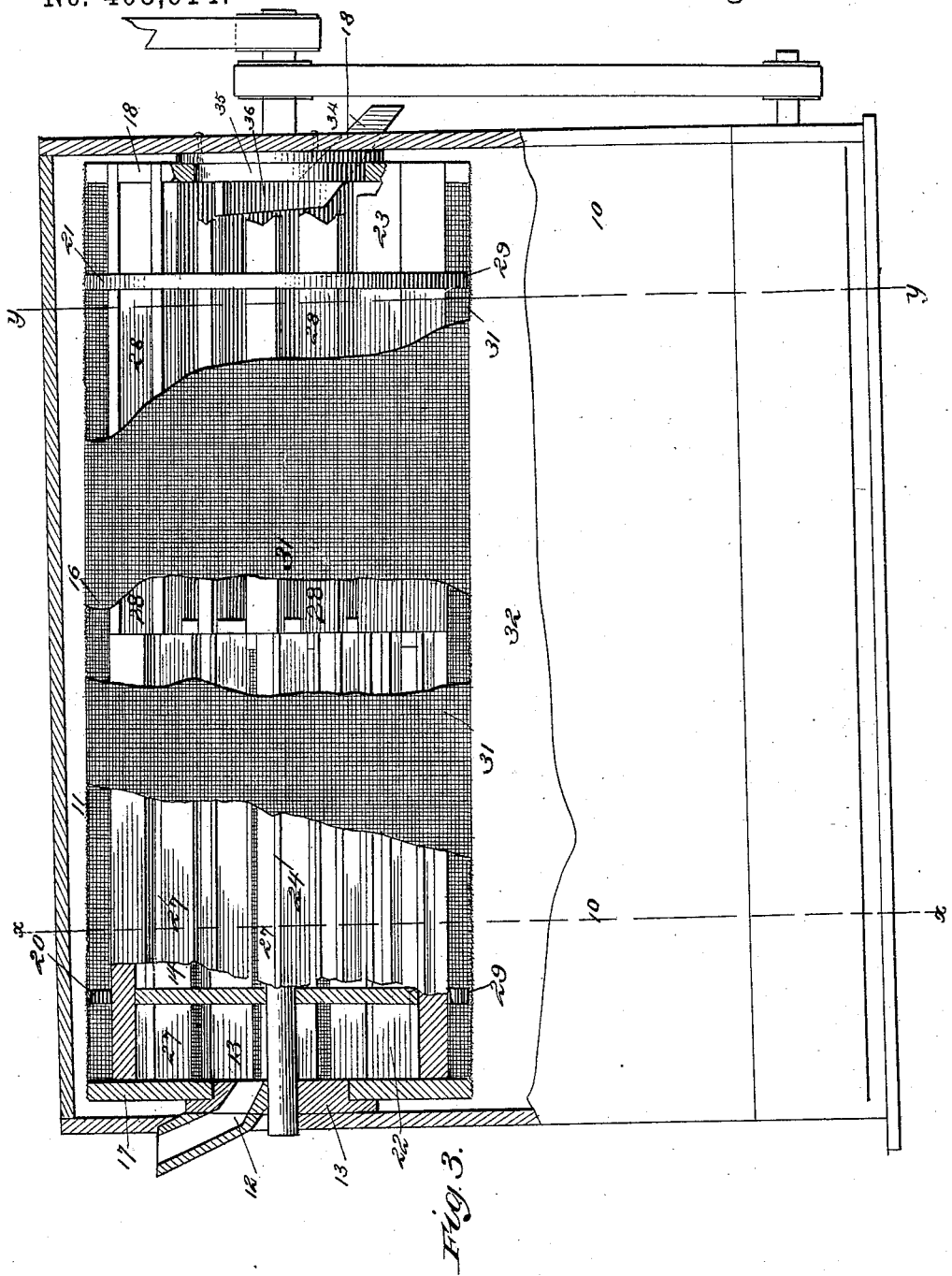

UNITED STATES PATENT OFFICE.

CYRUS T. HANNA, OF PITTSBURG, PENNSYLVANIA.

BOLTING-REEL.

SPECIFICATION forming part of Letters Patent No. 408,914, dated August 13, 1889.

Application filed September 27, 1888. Serial No. 286,571. (No model.)

*To all whom it may concern:*

Be it known that I, CYRUS T. HANNA, of Pittsburg, in the county of Allegheny and State of Pennsylvania, have invented new and useful Improvements in Flour-Bolts, of which the following is a full, clear, and exact description.

My invention relates to an improvement in flour-bolts, and has for its object to provide a bolt wherein, by reason of the peculiar construction of the reel buckets or elevators, specking is prevented and the material kept in contact with the cloth from the under side of the reel to the top thereof.

The invention consists in the construction and combination of the several parts, as will be hereinafter fully set forth, and pointed out in the claims.

Reference is to be had to the accompanying drawings, forming a part of this specification, in which similar figures of reference indicate corresponding parts in all the views.

Figure 1 is a transverse vertical section of my improvement on line x x of Fig. 3. Fig. 2 is a similar view on line y y of Fig. 3; and Fig. 3 is a side elevation, partially in section.

In carrying out the invention, within a suitable casing 10 a reel 11 is journaled in any approved manner, inclined from the head in direction of the tail, the material to be bolted being passed into the interior of said reel at the head by a spout 12, projected through a stationary flanged disk 13, through which the axle of the reel passes, the outer or head end of the said reel being apertured to revolve around the disk in loose contact therewith, as best shown in Fig. 2. By this means a closed head is obtained. The reel 11 is divided into two main compartments 14 and 15 by the central stepped partition 16. The head compartment, receiving the material, is adapted for gentle treatment to avoid specking, and the tail compartment for harsher or more rapid treatment.

The central stepped partition 16 or two abutting partitions are secured in any approved manner to the axle. The partition 16 is of less diameter than the end disks 17 and 18, and at or near said disks 17 and 18 similar stepped partitions 20 and 21 are preferably secured, forming two end compartments 22 and 23, the head compartment being the receiving-chamber and the tail compartment the discharge-chamber.

In the further construction of the reel the head compartments are essentially inclosed by a circular series of spaced longitudinal buckets 24, substantially wedge shape in cross-section, as best illustrated in Fig. 1, the inclined face 25 being the outer side and the wide end 26 the top face or carrying-surface when traveling upward, as is also best illustrated in Fig. 1.

By making the buckets wedge-shaped the material will be kept in contact with the cloth much longer than if made plain or of equal thickness throughout, the buckets holding the material outward upon the up side in contact with the cloth until near the top and discharging it over the inclines of the successive buckets upon the cloth a little to one side of the top upon the down side.

The buckets are completed by forming a longitudinal rib 27 integral with the inner side of the upward carrying-surface and projecting toward the narrow edge of the next bucket, whereby the passage of the material from the uppermost bucket to the next lower one upon the downward turn is facilitated, and as the said rib constitutes, essentially, a bridge for the space intervening the buckets the material is effectually prevented from falling in injurious quantities into the interior of the reel, producing specks. The buckets 24 are secured, respectively, to the partitions 16 and 20 and to the head-disk 17.

The reel-compartment 15 is walled by a series of thin flat buckets 28, secured, respectively, to the central partition 16, the tail partition 21, and the tail disks 18, the distance between the buckets 28 being much greater than between the buckets 24, as may be clearly seen by reference to Figs. 1 and 2.

Rings 29 are supported by studs 30 above the partitions 20 and 21, the outer surface of which rings is in the same plane with the periphery of the disks 17 and 18. The rings 29 are intended to support a silk-cloth cover 31 a distance from the buckets, the said cover being attached to the said rings and the head and tail disks in any suitable or approved manner.

Within the casing 10, below the reel, a hopper-shaped chute 32 is constructed, provided with slides 32ª, whereby the quantity of material delivered to the conveyer 33, located in the bottom of the chest, may be regulated, as shown in Fig. 1.

It will be observed that as the reel is revolved, which may be accomplished in any approved manner, the head buckets retain the material in contact with the cloth from a point essentially at the under side to a point substantially at the top, and that the material is discharged against the cloth almost at the top upon the down side.

By means of this construction the reel may be made to travel at a high speed. The material covers a great area of cloth, and the material can be bolted much faster through the same number of mesh than heretofore.

At the tail end of the reel, as the rib 27 is dispensed with and the spaces are wider between the buckets than at the head, the material is permitted to drop in the revolution of the reel into the interior of the same and out freely through the cloth into the hopper. The refuse material is delivered from the tail end of the reel through the medium of a downwardly-inclined chute 34. The chute is projected from the outside through a disk 35 similar to the head disk 13, and a hopper 36 is formed upon the inner face of the said disk 35 within the reel, as illustrated in dotted lines, Fig. 2, and positive lines, Fig. 3, whereby the material is conducted to the chute.

One or more conveyers may be employed, and they may be arranged side by side or one above the other, as desired.

Having thus described my invention, I claim as new and desire to secure by Letters Patent—

1. In a flour-bolt, a reel provided with a circular series of longitudinally disposed and spaced buckets, each substantially wedge-shaped in cross-section and provided with a rib projecting from the carrying-surface of one bucket toward the narrow edge of the next, substantially as shown and described.

2. In a flour-bolt, a reel provided with a series of longitudinally disposed and spaced buckets, each substantially wedge-shaped in cross-section and provided with a rib projecting from the carrying-surface of one bucket toward the narrow edge of the next, the said buckets being removed from the inner surface of the cloth, and the ribs of the buckets forming a bridge intervening the said buckets, substantially as herein shown and described.

3. In a flour-bolt, a reel divided into compartments inclosed by longitudinally disposed and spaced buckets, the distance between the buckets of the tail compartment being much greater than between the buckets of the head compartment, substantially as described.

4. In a flour-bolt, the combination with the head and tail disks and cover of a reel, which is divided into two compartments, of a series of spaced buckets encircling the head compartment, essentially wedge-shaped in cross-section and provided with longitudinal integral ribs, and flat buckets encircling the tail compartment, removed a greater distance apart than the head buckets, substantially as shown and described.

5. In a flour-bolt, the combination, with the head and tail disks of a reel, the cover, and a partition dividing the same into two compartments, of a series of spaced buckets encircling the head compartment within a cover and a distance therefrom, wedge-shaped in cross-section, provided with longitudinal ribs upon the inner edge of the widest face, flat buckets encircling the tail compartment, also within the cover, and rings supporting and retaining the cover a distance from the buckets, all combined to operate substantially as shown and described.

CYRUS T. HANNA.

Witnesses:
JAS. W. DRAPE,
JAS. D. SLOVER,